(12) United States Patent
Voegeli et al.

(10) Patent No.: US 8,348,670 B2
(45) Date of Patent: Jan. 8, 2013

(54) DEVICE AND METHOD FOR COMPUTER-ASSISTED LEARNING

(75) Inventors: Christian Voegeli, Adlikon (CH); Markus Gross, Uster (CH)

(73) Assignee: Dybuster AG, Zurich (CH)

( * ) Notice: Subject to any disclaimer, the term of this patent is extended or adjusted under 35 U.S.C. 154(b) by 1090 days.

(21) Appl. No.: 12/179,653

(22) Filed: Jul. 25, 2008

(65) Prior Publication Data
US 2009/0029328 A1 Jan. 29, 2009

(30) Foreign Application Priority Data
Jul. 25, 2007 (EP) .................................... 07405216

(51) Int. Cl.
*G09B 1/00* (2006.01)
(52) U.S. Cl. ........ 434/159; 434/156; 434/222; 434/307; 704/200
(58) Field of Classification Search .................. 434/156, 434/159, 167, 169, 222, 307, 319; 704/1; 283/46
See application file for complete search history.

(56) References Cited

U.S. PATENT DOCUMENTS

| | | | | |
|---|---|---|---|---|
| 5,715,469 A | * | 2/1998 | Arning | 715/210 |
| 2002/0115044 A1 | * | 8/2002 | Shpiro | 434/156 |
| 2005/0106540 A1 | * | 5/2005 | Wasowicz et al. | 434/178 |
| 2005/0251744 A1 | * | 11/2005 | Brill et al. | 715/533 |
| 2006/0149543 A1 | * | 7/2006 | Lassalle | 704/235 |

\* cited by examiner

*Primary Examiner* — Xuan Thai
*Assistant Examiner* — Banafsheh Hadizonooz
(74) *Attorney, Agent, or Firm* — Kilpatrick Townsend & Stockton, LLP

(57) ABSTRACT

A method for the computer-assisted learning of orthography, the method includes executing the following steps by a data processing system:
  retrieving (11) a main set of words from a data storage;
  retrieving (12) an error data set associated with said main set of words from the data storage;
  repeatedly executing the following steps:
    selecting (13) a word to prompt the user with, by computing, for each word from the error data set, a statistic measure related to the probability of an error occurring in the word, and selecting the word which has the maximum value of the statistic measure;
  prompting (14) the user with the word;
  accepting (15) a user input specifying a sequence of symbols;
  comparing (16) the user input with the word;
  updating (17, 18) and storing the error data set.

13 Claims, 2 Drawing Sheets

DEVICE AND METHOD FOR COMPUTER-ASSISTED LEARNING

FIELD OF THE INVENTION

The invention relates to the field of computer-assisted learning. It relates to a device and a method for computer-assisted learning of orthography as described in the preamble of the respective independent claims.

BACKGROUND OF THE INVENTION

Interactive learning (or teaching) systems are known to query a user by presenting a stimulus to the user and recording a user response. In the case of orthography learning, the stimulus typically is an audible playback of a spoken word or phrase, and the user response is said word or phrase, as typed by the user on a computer keyboard. The computer checks whether the typed response is correct, and then selects another word for the next query.

DESCRIPTION OF THE INVENTION

It is an object of the invention to create a device and a method for computer-assisted learning of orthography of the type mentioned initially, in which the selection of words should be such that the overall learning effect for the user, over a large number of queries, is as large as possible. A further goal is to simultaneously keep the use of computer resources, such as processor load and storage requirements, as small as possible.

Operating a learning system or device in a theoretically optimal way is satisfying to the user, since this avoids on the one hand needless repetition, leading to boredom, and on the other hand excessive variation and difficulty, leading to frustration. However, the computational requirements for optimal operation can be arbitrarily large, since the problem is intractable. Therefore, an object of the invention is to provide a device and method that operate as close as possible to the theoretically optimal way, while keeping the use of computer resources low. This allows implementing the method on computing devices with limited resources.

These objects are achieved by a device and a method for computer-assisted learning of orthography according to the corresponding independent claims.

The method for the computer-assisted learning of orthography thus comprises executing the following sequence of steps by a data processing system:
  retrieving a main set of words from a computer readable data storage medium;
  retrieving an error data set associated with said main set of words from the computer readable data storage medium, the error data set being associated with a particular user and comprising,
    a word error statistic (or statistical measure) associated with each word of said set; and
    a symbol error statistic (or statistical measure) associated with symbol pairs;
  repeatedly executing the following steps:
    selecting a word to prompt the user with, by computing, for each word of the main set or a subset of the main set of words, from the word error statistic and the symbol error statistic, a combined statistic measure related to the probability of an error occurring in said word when it is input by the user, and selecting the word which has the maximum value of said statistic measure;
    prompting the user with said word; in particular with an auditory representation thereof,
    accepting a user input specifying a sequence of symbols (or letters or characters) representing said word;
    comparing the user input with said word and preferably providing a feedback signal to the user, indicating whether the input was correct;
    updating the word error statistic associated with said word according to the user input, and storing the updated word error statistic in the computer readable data storage medium;
    updating the symbol error statistic according to the user input, and storing the updated symbol error statistic in the computer readable data storage medium. In consequence, by incorporating the word error statistic, the difficulty of learning a particular word is reflected, and by incorporating the symbol error statistic, the learning problems caused by confusing pairs of symbols are reflected. The combination of these two measures results in an improved adaptation to the user's individual challenges and learning progress.

Furthermore, the combination of word and symbol error statistics is a technically efficient representation of an error data set associated with a user: The purpose of the error data set is to represent the current learning state of the user and its progress over time. This learning state, in a naive implementation, might comprise, for example, an error probability associated with each word. In case the user makes an error in entering a word, this would have to be reflected in the error probability of this word. This could be done by increasing its error probability, causing the word to be prompted more often, until, after it was entered correctly a number of times, its error probability was low again. However, if one wished to reflect the interrelation between errors made in different words, such an approach falls short.

One approach to handle such interrelations would be to classify the error made in entering a particular word (that was prompted for) as being of a specific type, and then to search for all other words that may give rise to the same error, and then to increase the word error probability for these words. This would have to be done for each error occurring when entering the prompted word.

However, according to the invention, not only a word error statistic (such as an error probability) is stored and updated, but a separate symbol error statistic is stored and updated as well. This symbol error statistic represents errors arising from the confusion of symbol pairs, independently from the word error statistic, and reflects the interrelation of errors between words. Only when the combined error statistic is computed for selecting the next word, are the word error statistic and the symbol error statistic combined. This is computationally more efficient than updating the error statistic for each word after each error at each prompting step. The computational load is further reduced, for example, if only a subset of the main set of words is considered for prompting.

The invention is based in the following considerations: We want to measure the progress that a user makes when using our system to learn a certain set of words. When we are able to measure the progress, we can also predict how large the progress will be if a controller, that is, a device according to the invention, asks for a specific word, and this word is entered correctly. We are hence able to select the next word in such a way, that the learning progress proceeds as fast as possible. Entropy in general is a good criterion to monitor the success of a learning process. Entropy measures the uncertainty of an observer: The smaller the entropy, the smaller the uncertainty. In the context of a teacher asking questions (words prompted by a learning system) and expecting answers from a pupil (words entered by user), one can use entropy to measure the uncertainty of the answer. The smaller the entropy, the more likely a certain set of answers, the better a pupil has learnt. If the entropy is 0, this means that the answer is known before it is given, which implies that the pupil can only give one answer (assuming that the pupil wants to give the correct answer).

For our controller, we consider two different levels: a symbol level and a word level. Following the above introduction, the next word that the controller prompts to the user is selected according to two objectives: minimizing the symbol error entropy and minimizing the word error entropy. The basic idea is that the controller selects the next word, which, when entered correctly, will decrease these two entropies at least as much as any other word. This should result in the fastest learning progress.

In a preferred embodiment of the invention, the error statistics used for the word error and the symbol error are error probabilities. More specific, the word error statistic, for a given word, is represented by the probability of a spelling error occurring in said word, that is, the word error probability.

When initializing the learning system for the first use by a particular user, the word error probability is preferably set to a predetermined value, either the same value for each word, or a value derived from measurement of average user performance, or a value based on the symbol error probability summed over the word.

The word error probability is updated according to the user input, preferably by dividing the number of misspellings by the number of letters in the word. In order to let the probability converge to the correct value—zero and not one, both values being related to an entropy value of zero—this number is further divided by two and is used as word error probability. Preferably, the last r values of the word error probability are stored for each word, with, for example, r=3. A weighted sum of these values, with the most recent value having the largest weight, is then used as the word error probability for this word, when the combined error statistic for each word is computed in order to select the next word for prompting the user.

For r=1, only the last value is stored, and whenever a new value is computed, a weighted sum of these two values is stored, further minimizing storage requirements.

The symbol error statistic, in this embodiment, is represented by a global symbol error probability, which is defined as the sum, over all symbols, that is, for examples, the letters of the alphabet used, of the probability of a symbol (or letter) being entered erroneously, weighted by the probability of said symbol (or letter) occurring. Henceforward, for the sake of simplicity, reference will be made to letters, but it is understood that all applies to symbols as well. A symbol may be or may represent a subunit of a written or spoken word, for example, a sequence of letters. For a particular word, a symbol error probability is defined as being the sum, over all letters of the word, of the probability of a letter being entered erroneously.

This probability is preferably represented by a symbol error probability matrix, this matrix being an N by N matrix, where N is the number of symbols of the alphabet used to represent words, and the value of matrix element at position k,l representing the conditional probability of the user entering the k-th letter instead of the l-th letter of the alphabet. This matrix is specific to each user and will change as training progresses. It provides a compact representation of the user's spelling disability; ideally it is the unity matrix, that is, no letter confusion is expected. In reality, nonzero off-diagonal elements represent letters that are confused. The matrix is automatically updated during training and stored between training sessions.

In a preferred embodiment of the invention, the error statistics used for the word error and the symbol error are a conditional word error entropy, and a conditional symbol error entropy. The computation of the entropy (as defined in information theory) of a random variable from the probability distribution of the random variable is well known. In this embodiment, the conditional word error entropy is derived from the word error probability, and measures the uncertainty of a word error over the dictionary (that is, over the main set of words being processed). Likewise, the conditional symbol error entropy is derived from the symbol error probability, and measures the uncertainty of any symbol of the alphabet. This is the uncertainty that still remains after a certain learning progress has been made.

Thus, in this embodiment, the error probabilities as described above are computed and updated, and then the corresponding entropies can be computed from the error probabilities. Preferably, the entropies, or a target function combining the entropies, for example, as a weighted sum, are not computed explicitly but are minimized by choosing the words according to a function of their error probabilities.

Whereas the embodiment using entropies as a statistic is theoretically more satisfying, a theoretically complete implementation that selects the word that maximally minimizes the uncertainty when entered correctly would involve further considerations reflecting the interrelations between words, and would become computationally intractable. Additionally, the binary entropy function has two global minima due its symmetry, out of which only one is a valid solution in the context of this invention.

It is therefore preferred to use the embodiment based on error probabilities, and to select the word that maximizes a combination of the word error probability and the symbol error probability. Surprisingly, this pragmatic approach also leads to a very good learning convergence and thus reduces the time the system is used. In the short term, that is, before each prompt, a further technical effect is to reduce the computational load on the processor by computing the (simpler) error probabilities instead of the (more complex) entropy measures, which has to be done for each word in the dictionary at each step of the learning process. In particular, optimising the performance based on error probabilities can be implemented in a more efficient manner since the error probability has a single minimum whereas the (binary) entropy function has two minima.

In a further preferred embodiment of the invention, when determining the up-to-date combined statistic (i.e. the combination of error probabilities or entropies), the method does not re-compute the statistic and then sort the words according to the statistic. Instead, it processes, in a single pass, all of the words of the set being considered, computing the current value of the statistic for each word, and storing a reference to the word having the highest value. If a word with a higher value is encountered, the reference is changed to refer to this word. After processing all of the words, the reference points to the word with the highest value of the statistic. This word is then used to prompt the user, without further processing or storage requirements.

In a further preferred embodiment of the invention, a word that satisfies predetermined criteria is marked (or labeled) as being "learnt" and is no longer presented to the user. Such a criterion is, for example, that for the last $q1$ number of queries using this word, the word has been entered correctly $q2$ times, and incorrectly q3=q1−q2 times. For example, q1=3, q2=3, q3=0. A word that satisfies such a criterion will also have a low or zero word error probability, as updated according to the procedure described above.

In a further preferred embodiment of the invention, words that are marked to be "learnt" are moved to the end of the list of words, and, when determining the error statistic, only a predetermined number or predetermined percentage of the set (or subset) of words is processed. In consequence, the "learnt" words at the end of the list are not processed, which makes sense since they cannot be expected to have a significant uncertainty. In this manner, the processing load is further reduced.

In a further preferred variant of the invention, the word error probability is increased after a predetermined time has elapsed. This causes words that formerly were "learnt" to be eventually selected again, achieving long-term repetition of words.

A computer program for the computer-assisted learning of orthography according to the invention is loadable into an internal memory of a digital computer, and comprises computer program code to make, when said computer program code is loaded in the computer, the computer execute the method according to the invention. In a preferred embodiment of the invention, a computer program product comprises a computer readable storage medium, having the computer program code recorded thereon.

Further preferred embodiments are evident from the dependent patent claims. Features of the method claims may be combined with features of the device claims and vice versa.

BRIEF DESCRIPTION OF THE DRAWINGS

The subject matter of the invention will be explained in more detail in the following text with reference to preferred exemplary embodiments which are illustrated in the attached drawings, in which.

The reference symbols used in the drawings, and their meanings, are listed in summary form in the list of reference symbols. In principle, identical parts are provided with the same reference symbols in the figures.

DETAILED DESCRIPTION OF PREFERRED EMBODIMENTS

Figures 1, 6:
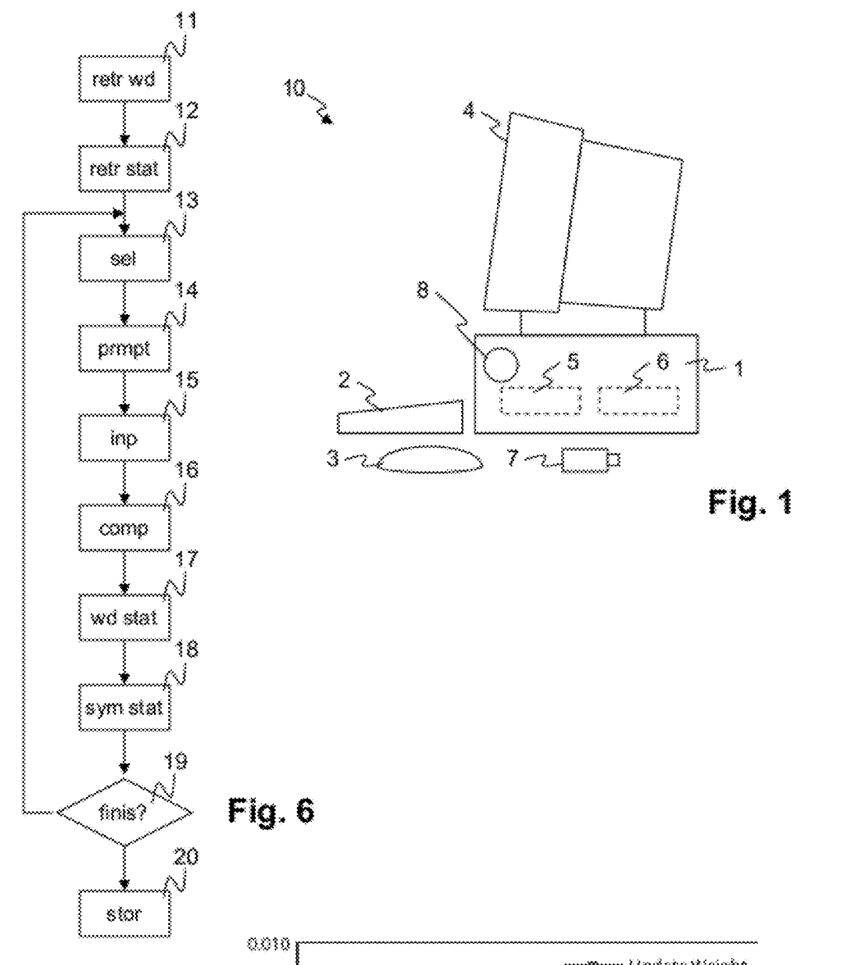
FIG. 1 schematically shows a computer system.
FIG. 6 shows a flow diagram of the method.

FIG. 1 schematically shows a computer 10 on which the inventive method and system are implemented: The computer 10 comprises a main unit 1, a keyboard 2 and a mouse 3 for user input, a loudspeaker 8 for auditory (sound) output, preferably for prompting the user, and a display screen 4 for displaying text and graphic information to the user. The main unit 1 comprises a data processing unit 5 such as s microprocessor, and a data storage unit 6 such as a hard disk or random-access-memory (volatile or non-volatile), and is preferably also configured to store data on and read data from a removable data storage device 7 such as a diskette, compact disc, memory stick or memory card. The abovementioned computer components may of course also be incorporated in a lap-top or handheld device.

The inventive method is established according to the following principles:

Words can be ordered by their probability of occurrence in the language corpus to be learnt. Let |D| be the total number of words in the training set. We can partition the dictionary $D=\{w_1, \ldots, w_{|D|}\}$ into a set $M=\{M_1, \ldots, M_{|M|}\}$, $M_m=\{w_{m1}, \ldots, w_{m|M_m|}\}$ of modules, such that $M_1 \cup M_2 \cup \ldots \cup M_{|M|}=D$ and the modules are disjoint. Also, the modules should be ordered by difficulty and probability with module $M_1$ containing the most simple and most frequent words. For this purpose, we assign a difficulty $L_D(w_j)$ to each word $w_j$ and our first ordering criterion for each word $w_{mi}$ and $w_{lj}$ in modules $M_m$ and $M_l$ $$m \geq l \Longleftrightarrow L_D(w_{mi}) \geq L_D(w_{lj}). \tag{1}$$

To guarantee optimal progress during training the second ordering criterion follows probability of occurrence: Let $P(w_j)$ denote the probability of occurrence of word $w_j$. We sort by $$m \geq l \Longleftrightarrow P(w_{mi}) \leq P(w_{lj}). \tag{2}$$

Our statistical language analysis also found that these two objectives are correlated, because on average, more frequently used words are less difficult. We tried different combinations of the two objectives for the final sorting criterion $\tilde{L}_D(w_j)$ of our dictionaries and settled on $$\tilde{L}_D(w_j) = \frac{L_D(w_j)^2}{P(w_j)}. \tag{3}$$

Sorting the words of a language corpus according to rule (2) and omitting the less frequent and hence more difficult words allows to limit the dictionary used for learning to a size of e.g. 8000 words instead of over 330,000 words (for the English language). The sizes of individual modules range between 100 words for the simple ones and 250 words for the more advanced modules.

Word Difficulty

Our measure of the word difficulty $L_D(w_j)$ is based on the following considerations:

First, we know from information theory that, if $|w_j|$ is the length of the word measured in letters, the average minimum number of bits needed to code this word is $H(X)|w_j|$, where $H(X)$ represents the symbol entropy of the language of the word $w_j$. Since $H(X)$ is constant, it is safe to assume that the word difficulty is proportional to its length, that is $$L_D(w_j) \propto |w_j|.$$

There are dyslexic pairs which make certain words more difficult to learn for people with dyslexia. We call the letters belonging to a dyslexic pair a dyslexic pitfall. We define a function $\text{pit}(x_i)$ for the letters $x_i$ as $$\text{pit}(x_i) = \begin{cases} 1, & \text{if\_x}_i\text{\_is\_dyslexic\_pitfall} \\ 0, & \text{else}, \end{cases} \tag{5}$$

$x_i \in A$. Finally, "silent letters", which are written but not pronounced, pose an additional difficulty. They appear very frequently and in different combinations in English and French, but can be mostly represented through digrams. The function $sil(x_k, x_l)$ defines a weight for these pairs $$sil(x_k, x_l) = \begin{cases} 1, & \text{if } (x_k, x_l) \text{ is\_silent\_letter\_pair} \\ 0, & \text{else,} \end{cases} \quad (6)$$

$\forall (x_k, x_l) \in A^2$. We calculate the difficulty $L_D(w_j)$ as $$L_D(w_j) = |w_j| + \sum_{i=1}^{|w_j|} pit(x_{i,j}) + \sum_{i=1}^{|w_j|-1} sil(x_{i,j}, x_{i+1,j}). \quad (7)$$

Thus, the occurrence of a silent pair or dyslexic pitfall letter simply increases the perceived length of a word and eventually the number of bits to encode it, because a larger effort is needed to learn and remember the word.

Interactive Learning and Word Selection

Word Selection and Error Entropy

The purpose of the word selection controller is to select a word $w_j$ from a module $M_m$ in such a way that the user makes most progress. Progress, in turn, means to reduce the uncertainty of the knowledge about the words in $M_m$. To this end, we define and utilize error entropy as a measure for the user's uncertainty and progress. An error entropy of 0 thus means that the user has succeeded in learning the module. The objective of the controller is hence to minimize error entropy. To this end, we distinguish between symbol error entropy and word error entropy.

Symbol error entropy: We define a symbol error matrix or symbol confusion matrix $P_c$ to monitor the symbol error probability. $P_c$ is a N×N-matrix, where $N=|A|$. $p(x_k|x_l)$, $x_k, x_l \in A$, is the conditional probability that a user enters erroneously $x_k$ instead of $x_l$.

$$P_C = \begin{bmatrix} \cdots & \cdots & \cdots \\ \cdots & P(x_k|x_l) & \cdots \\ \cdots & \cdots & \cdots \end{bmatrix}, x_k, x_l \in A. \quad (8)$$

The columns of $P_c$ partition unity. When the user decreases the number of errors over time through proper learning, $P_c$ becomes the identity matrix. We initialize it with random numbers and a bias towards $P(x_l|x_l)=bias \leq 1$. In another preferred embodiment of the invention $P_c$ is initialized with values that are typical for dyslexic persons.

Let E be a binary random variable with $E=e_1$ indicating an error and $E=e_0$ being the correct answer. We define the error probability $P_E(x_l)$ for $x_l$. It is the probability that a user does not enter $x_l$ when he is supposed to do so, and thus $$P_E(x_l) = P(e_1|x_l) = \sum_{k=1, k \neq l}^{N} P(x_k|x_l) = 1 - P(x_l|x_l). \quad (9)$$

Now, the global symbol error probability $P_E(X)$ can be calculated as a weighted sum of the conditional errors.

$$P_E(X) = P(E|X) \quad (10)$$
$$= \sum_{l=1}^{N} P(x_l) P_E(x_l)$$
$$= 1 - \sum_{l=1}^{N} P(x_l) P(x_l|x_l).$$

We are now in place to define a conditional symbol error entropy $H(E|X)$. It measures the residual uncertainty of any symbol of A. $H(E|X)$ can be expressed as the weighted sum of conditional entropies, where the conditional entropy is the error entropy of an individual symbol:

$$H(E|X) = -\sum_{l=1}^{N} P(x_l) \sum_{k=1}^{N} P(x_k|x_l) \log(P(x_k|x_l)). \quad (11)$$

The maximum $H(E|X)=\log(N)$ is reached when each column of $P_c$ is uniformly distributed. The minimum $H(E|X)=0$ is obtained if for each l there is a k such that $P(x_k|x_l)=1$. Theoretically, this state can be achieved if a user constantly confuses a particular letter with particular other one. In this case, we know the confusion and no uncertainty is left. In practice, however, the minimum is reached for $P(x_l|x_l)=1$, $\forall l$. The fastest progress in learning is thus achieved by efficiently minimizing $H(E|X)$.

Symbol errors are preferably detected by comparison algorithms, known e.g. from spell-checking applications, or simply by signalling an error to the user as the word is typed, and, for example, only accepting valid letters, that is, requiring the correct letter to be typed before the next letter can be entered.

Word error entropy: A second important aspect of error is related to words. For instance, the anagrams "heart" and "earth" will have equal influence on $H(E|X)$ while they pose different difficulties at the word level. There is extensive literature about word error probabilities from computational linguistics, speech recognition, automatic spell checking, etc. Most of them employ some sort of letter confusion, similar to $H(E|X)$. Therefore, we define word error entropy through the following variables. Let D be the random variable accounting for events (words) from D and let the word error be a binary random variable E, as before. $P_E(D)=P(E|D)$ is the probability of a spelling error in a word of D. Thus $\forall w_j \in D$ $$P(E=e_1|D=w_j)=P(e_1|w_j)=1-P(e_0|w_j). \quad (12)$$

We initialize $P(e_1|w_j)$ for every word $w_j=\{x_{1j}, \ldots, x_{|w_j|j}\}$. When a user enters an answer $\tilde{w}_j=\{\tilde{x}_{1j}, \ldots, \tilde{x}_{|w_j|j}\}$ to the prompted $w_j$, we compare $\tilde{w}_j$ to $w_j$ for the number $N_E(w_j, \tilde{w}_j)$ of misspellings $$N_E(w_j, \tilde{w}_j) = \sum_{i=1}^{|w_j|} 1_{\{x_{ij} \neq \tilde{x}_{ij}\}}. \quad (13)$$

We essentially count the misspellings when the user types the word. $P(e_1|w_j)$ is approximated by $N_E(w_j, \tilde{w}_j)$ $$P(e_1 | w_j) \approx \frac{N_E(w_j, \tilde{w}_j)}{|w_j|}. \quad (14)$$

This is used as updated word error probability. In order to ensure convergence of the uncertainty minimization to the desired error probability (with value zero rather than one), this value is preferably divided by two. This division can be incorporated when computing the updated word error as a weighted sum of previous values of $P(e_1|w_j)$.

We finally define a conditional word error entropy $H(E|D)$ which measures the uncertainty of a word error over the dictionary D by $$H(E | D) = -\sum_{j=1}^{|D|} P(w_j) \sum_{i=0}^{1} P(e_i | w_j) \log(P(e_i | w_j)). \quad (15)$$

The maximum entropy $H(E|D)=1$ is reached when $P(e_0|w_j)=p(e_1|w_j)=0.5$, $\forall j$. It is minimal, i.e. $H(E|D)=0$, if either all letters are wrong or all are correct. In practice, of course, the former does not occur. As before, efficient minimization of $H(E|D)$ guarantees fastest progress in learning.

Target function: The considerations from above suggest a target function or cost function with some linear combination of $H(E|X)$ and $H(E|D)$. To this end, we define $$f_H = H(E|X) + \lambda_H H(E|D). \quad (16)$$

While conceptually more elegant, it has turned out in practice, however, that a controller minimizing error entropy can occasionally delay the prompting of poorly learnt words due to the two global minima of the binary entropy function. Since only one minimum is optimal in the context of this invention, using a target function based on entropies requires explicit treatment of the invalid minima, which is computationally expensive.

Therefore we recommend minimising a linear combination of $P(E|X)$ and $P(E|D)$ instead, which reduces the computational load on the processor. The goal of the controller is to select the next word so as to minimize the cost function as efficiently as possible—measured in the number of words and symbols to be prompted. Since, due to the interdependency between the words, it is computationally intractable to predict the most efficient order according to this measurement over all word and symbol prompts, our implementation utilises a greedy approach and defines a weight $\alpha(w_j)$ for each word accounting for the symbol and word level errors:

$$\alpha(w_j) = \lambda_j P(e_1 | w_j) + \frac{1}{|w_j|} \sum_{i=1}^{|w_j|} (1 - P(x_{ij} | x_{ij})) \quad (17)$$

$$\lambda_j = |D| \cdot P(w_j).$$

Using $p(w_j)$ in $\lambda_j$ enforces more frequent words to be prompted earlier, while employing $|D|$ normalizes the two terms adequately. Again, in practice we minimize word error within the module $M_m$ while the symbol error is minimized across all modules. The selection criterion for the next word $w_i$ thus yields to $$\alpha(w_i) = \max\{\alpha(w_j) | w_j \in M_m = \text{currentmodule}\}. \quad (18)$$

The modules are switched when $P(E|D)$ falls below a threshold, which can be set to 0, if one wants every word to be entered correctly at least once.

Implementation

Figure 2:
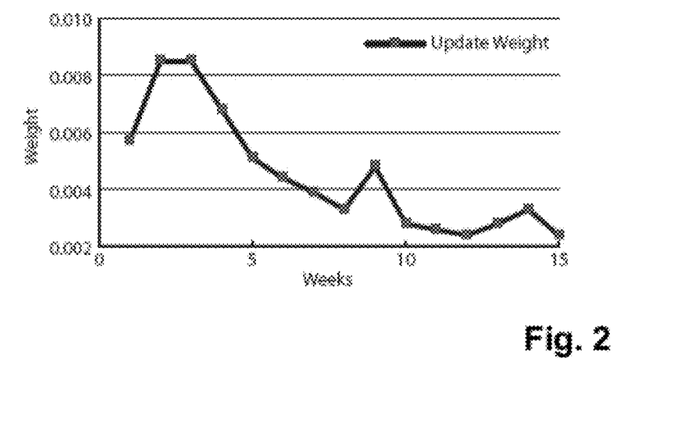
FIG. 2 displays an example of the relative contribution of a symbol as a function of its number of repetitions for a specific user.

Two issues are now discussed:

The first one relates to the practical computation and normalization of the symbol error matrix $P_c$. Symbol confusion should have more weight for an inexperienced user and should decrease over time to avoid too many repetitions due to typos etc. Thus we initialize $P_c$ with a column sum of 100 and a bias of 0.25 towards correct symbol input. After r repetitions of a symbol $x_i$, we renormalize each column and r increases linearly with each renormalization. We thus achieve that the relative error asymptotically decreases towards 0. FIG. 2 displays an example of the relative contribution of a symbol as a function of its number of repetitions for an actual user working with an embodiment of this invention.

The second issue is word error probability. For implementation and update, we define that three consecutive correct answers label the word as "learnt". Such words will not be prompted anymore unless one introduces aging and increases the word error probability again over time (see below). Also, words with too many errors should be repeated immediately, but not too often in direct sequence. This requires a careful implementation of $P(e_1|w_j)$, i.e. $P(e_0|w_j)$. Ours preferably employs a window of three inputs across which we compute a weighted average to approximate word error. The weights assign a higher importance to more recent inputs of $w_j$. In addition, we employ a sigmoid mapping to the word difficulty $L_D(W_j)$ to initialize the controller properly.

Repetition

Aging and Forgetting

There are two different types of repetition: one helps to initially acquire information, the second one prevents forgetting it. To illustrate this concept, let us consider learning new words of a foreign language. Typically one repeatedly reads or writes the same words within a short period of time, e.g. one week, when one learns the words for the first time. At the end of this learning phase, one will most likely know the words by heart. However after some time, one will not remember the words correctly and one has to repeat the words in order to pass them from short term to long term memory. Depending on the difficulty of a word, one needs to perform this repetition several times.

The short term repetition is inherently included in the system described in the previous Section by the re-computation of the word error probability (14) and by requiring three correct answers before a word is considered "learnt". If an answer decreases the word error probability of word $w_j$, it also decreases its associated weight $a(w_j)$ in (17). If the words are selected carefully, (18) will then cause a different word than $w_j$ to be prompted next. In this way, $w_j$ will not be repeated immediately but will be prompted over an extended period of time. The actual length of the period depends on the number of not "learnt" words of the module containing $w_j$, on the relative difference of their frequencies $P(w_j)$ and their word error probabilities.

Figure 3:
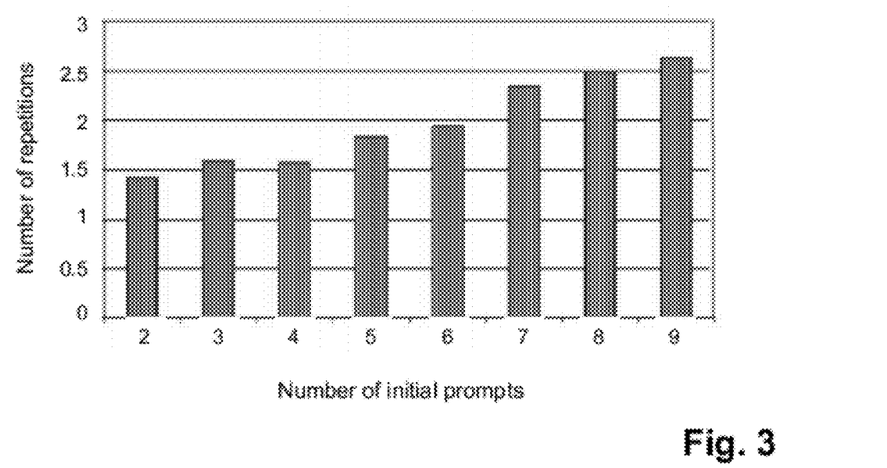
FIG. 3 shows the number of repetitions as a function of the number of initial prompts for a word.

In order to simulate forgetfulness and to achieve long term repetition after a word $w_j$ has been "learnt" for the first time, i.e. in our embodiment of the invention entered correctly three times in a row, one increases the word error probability $P(e_1|w_j)$ of $w_j$ again over time. We call the moment when a word was last prompted for learning $t_0$. $P(e_1|w_j)$ is increased depending on the difference between $t_0$ and the current time t. The larger the difference, the larger the increase. This increase simulates aging of the word error probability. $P(e_1|w_j)$ preferably also depends on how difficult it was to "learn" $w_j$ at the beginning. This difficulty can be measured by counting the number of prompts $n_j$ which were necessary to get to $t_0$. FIG. 3 illustrates that the number of repetitions (vertical axis) increases depending on the number of initial prompts for a word (horizontal axis), so that the word can be considered more difficult the more often it was initially prompted.

Hence, the word error probability $P_r(e_1|w_j)$ for repetition at time t can be described as $$P_r(e_1|w_j) = \text{age}(P(e_1|w_j), t-t_0, n_j), \quad (19)$$

where $$P(e_1|w_j) = 0 \Longrightarrow \text{age}(P(e_1|w_j), t-t_0, n_j) = 0, \quad (20)$$

and where $\text{age}(P(e_1|w_j), t-t_0, n_j)$ is a monotonously increasing function for all parameters, and $P(e_1|w_j)$ is computed according to (13) and (14). Ideally, age( ) should not increase too quickly in time for values $t-t_0$ close to 0. Otherwise, a word would be repeated too soon after being "learnt". Sigmoid or exponential functions are well suited for this purpose. To prevent too early repetitions, one can also introduce a minimal time to repetition, $t_r$, with $$t-t_0 \leq t_r \Longrightarrow \text{age}(P(e_1|w_j), t-t_0, n_j) = 0. \quad (21)$$

For all words $w_j$ which are to be repeated it thus holds that $P_r(e_1|w_j) \geq 0$. By including $n_j$ in age( ), the time till a word is actually repeated is shorter for difficult words.

Figure 4:
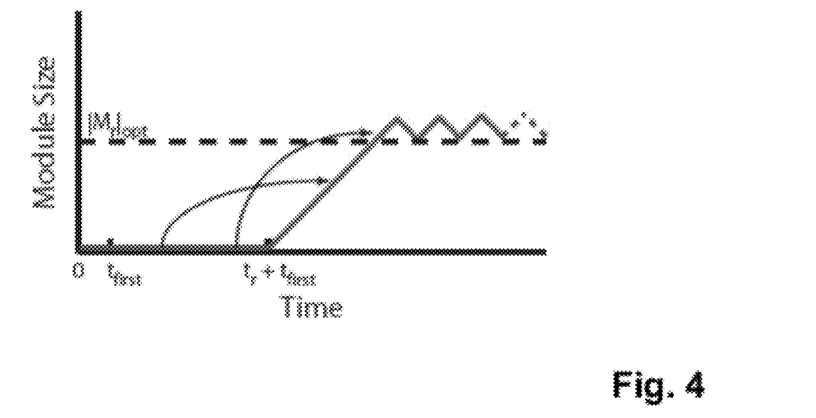
FIG. 4 shows a preferred trajectory of the size of a repetition module over time.

To model repetition within the above presented concept of word modules, all words which are to be repeated are collected in a repetition module $M_r$. Within $M_r$, the word error probability of (17) is replaced by $P_r(e_1|w_j)$. If $P_r(e_1|w_j)$ reaches 0 through the computation of $P(e_1|w_j)$, the word $w_j$ is again removed from $M_r$. When a user works with our system, the time spent on $M_r$ and on the other modules has to be carefully balanced. Too much repetition will get boring, too little repetition will reduce the long term learning effect. Furthermore, $M_r$ should always maintain a certain optimal size $|M_r|_{opt}$, in order to allow repetition within repetition. FIG. 4 shows a preferred trajectory of the size of the repetition module over time. $t_{first}$ denotes the time the first word is "learnt". As FIG. 4 shows, the number of repetition prompts is smaller than the number of initial prompts, so that one is able to repeat old words and still progress learning new words.

Implementation

As with the implementation of the word selection without repetition, the implementation of the repetition can be fine-tuned. We limit our observation to two aspects.

Figure 5:
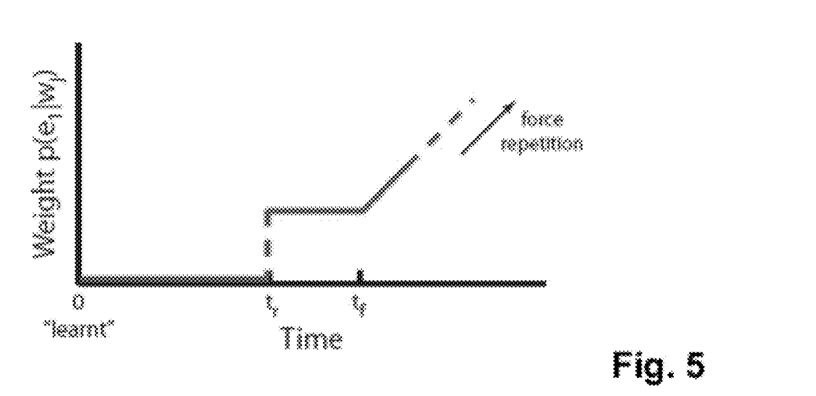
FIG. 5 shows an increase of an aging weight depending on time.

The first one concerns the implementation of age( ). age( ) has to guarantee that all words in $M_r$ are prompted sooner or later. It hence as to increase $P(e_1|w_j)$, so that also simple words with low word error probabilities are asked, even if there are much more difficult words present in $M_r$. In order to comply with the constraints for age( ) from above, we thus multiply $P(e_1|w_j)$ with a weight, which is 0 for $t-t_0 \leq t_r$, constant for a certain time span $t_f - t_r$ and then continuously increases over time. The initialization value at $t_r$ depends on $n_j$ and the word difficulty $L_D(w_j)$ If $t_f - t_r$ is chosen large enough, the constant time span makes age( ) discriminate less between the words and thus allows repetition within repetition. Typically, we set $t_f - t_r = t_r/2$. The increase of the aging weight depending on time, in a qualitative manner, is shown in FIG. 5.

The second observation deals with the initialization of $P(e_1|w_j)$ at $t_r$. As in the section on the implementation of word selection $P(e_1|w_j)$ is implemented using an input window of three answers. At $t_r$, only the oldest entry is set to a value $\geq 0$. The other entries are set to 0. This implies that if the word is entered correctly the first time it is asked, it will be considered "repeated" immediately. Otherwise, it will have to be prompted correctly three times in row. This prevents unnecessary and boring repetitions.

In summary, the data being stored between separate learning sessions preferably comprises:

the user's personal symbol confusion matrix (or symbol error matrix) $P_c$.

the list of words, or a reference to a predetermined set of words.

the ordering of the list of words. The ordering may be implicit in the order in which the words are stored, or indicated explicitly by an index number stored and associated with each word.

for each symbol:
the probability of occurrence $P(x_i)$ over the language.

for each word:
its probability of occurrence $P(w_j)$ over said list of words.
the updated word error probability, or its last r values, in particular r=3. The last r values can be kept in a ring buffer of constant size in order to minimize storage usage and time spent on memory management.
a counter q2 indicating how often the word has been entered correctly in the last q1 queries.

In order to allow repetition of words, the following additional minimal data set needs to be stored for each word:
a time at which the word was last considered to be "learnt"; and
a counter representing how often the word has been in a repetition mode.

Since recomputing the necessary statistics from the minimal data set to be stored is rather time consuming, we suggest to store the following more complete data set. By doing so, we trade higher computational speed for larger storage usage. The more complete data set stored on a computer readable storage medium at the end of a training session consists of:

the user's personal symbol error matrix;
for each symbol:
the probability of occurrence over the language;
the symbol error probability $P_E(x_i)$, allowing to only compute it in (17) if the column of PC associated with $x_i$ is modified;
a repetition counter r for the number of times the symbol has been prompted since the last renormalization of its column in the confusion matrix.

the set of words, or a reference to a predetermined set of words;
the ordering of the list of words; and
for each word:
its probability of occurrence over the said list of words;
its word difficulty $L_D(w_j)$;
the updated word error probability, optionally including its last r values, in particular r=3;
a counter q2 indicating how often the word has been entered correctly in the last q1 queries;
a counter for the number of times a word has been queried in total;
a flag indicating whether the word is "learnt";
a time at which the word was last considered to be "learnt"; and a counter representing how often the word has been in the repetition module (or in repetition mode). To minimize the storage used, the same counter is preferably also used as a flag indicating whether the word is part of the repetition module.

The maximum data set to be stored at the end of a training session contains for each word a list consisting of:
the exact times when a word was prompted; and
the exact sequences of keystrokes (including corrections) entered by the user for each time the word was prompted.

Based on this information, all statistics mentioned above can be recomputed.

FIG. 6 shows a flow diagram of the method, with the steps being:
retrieving 11 a main set of words from a data storage ("retr wd");
retrieving 12 an error data set comprising the word error statistic and the symbol error statistic ("retr stat");
repeatedly executing the following steps:
selecting 13 a word to prompt the user with ("sel");
prompting 14 the user with said word ("prmpt");
accepting 15 a user input specifying a sequence of symbols ("inp");
comparing 16 the user input with said word ("comp");
updating 17 the word error statistic ("wd stat");
updating 18 the symbol error statistic ("sym stat");
determining 19 whether the training session should be continued ("finis?"); otherwise
if the session is to be ended: storing 20 the error data set and stopping ("stor").

While the invention has been described in present preferred embodiments of the invention, it is distinctly understood that the invention is not limited thereto, but may be otherwise variously embodied and practised within the scope of the claims.

The invention claimed is:

1. A method for the computer-assisted learning of orthography, the method comprising executing the following steps by a data processing system:
   a) retrieving a main set of words from a computer readable data storage medium, each word comprising one or more symbols;
   b) retrieving an error data set associated with said main set of words from the computer readable data storage medium, the error data set comprising,
      1) a word error statistic associated with each word of the main set; and
      2) a symbol error statistic associated with symbol pairs; and
   c) repeatedly executing the following steps:
      1) selecting a word from at least one of the main set and the error set to prompt a user with by computing, for each word of the main set or a subset of the main set of words, a combined statistic measure from the word error statistic and the symbol error statistic, wherein the combined statistic measure is related to the probability of an error occurring in said word when it is input by the user, and selecting the word which has the maximum value of said combined statistic measure;
      2) prompting the user with said word;
      3) accepting a user input specifying a sequence of symbols representing said word;
      4) comparing the user input with said word;
      5) updating the word error statistic associated with said word according to the user input, and storing the updated word error statistic in the computer readable data storage medium;
      6) updating the symbol error statistic according to the user input, and storing the updated symbol error statistic in the computer readable data storage medium.

2. The method of claim 1, wherein the step of selecting the word which has the maximum value of said statistic measure maximizes a combined entropy, said combined entropy comprising a conditional symbol error entropy and a conditional word error entropy, wherein the conditional symbol error entropy is derived from the symbol error probability and measures the uncertainty of any symbol of the alphabet, and the conditional word error entropy is derived from the word error probability and measures the uncertainty of a word error over the main set or subset of words.

3. The method of claim 1, wherein computing, for each word of the main set or a subset of the main set of words, from the word error statistic and the symbol error statistic, the combined statistic measure comprises:
   a) computing, for each word, a word error statistic being a word error probability, that is, the probability of a spelling error occurring in said word;
   b) computing, for each word, a symbol error statistic being a symbol error probability, that is the sum, over all symbols of the word, of the probability of a symbol being entered erroneously;
   c) computing, for each word, a weighted sum of its word error probability and its symbol error probability.

4. The method of claim 3, comprising the steps of a) marking a word as being "learnt", if for the last q1 number of queries using this word, the word has been entered correctly q2 times, and incorrectly q3=q1−q2 times;
   b) storing the time at which the word is marked as "learnt";
   c) when a predetermined time span after this stored time has elapsed, increasing the word error probability over time, thereby increasing the combined statistic measure.

5. The method of claim 1, wherein the step of updating the word error statistic according to the user input comprises the steps of dividing the number of misspellings by the number of symbols in the word and setting a current word error probability equal to a weighted sum of a predetermined number of previously determined word error probabilities; and of storing the current word error probability as one of said predetermined number of previously determined word error probabilities.

6. The method of claim 1, further comprising the step of storing and updating, in computer readable form, the symbol error statistic represented by a symbol error matrix, this matrix being an N by N matrix, where N is the number of symbols of the alphabet used to represent words, and the value of matrix element at position k,l represents the conditional probability of the user entering the k-th symbol instead of the expected l-th symbol of the alphabet.

7. The method of claim 6, wherein the step of updating the symbol error statistic according to the user input, comprises the step of, for each expected symbol of the word, said expected symbol being the l-th symbol of the alphabet, for which the k-th symbol was input, increasing the value of the matrix element at position k,l relative to the value of the other matrix elements nk,l, where nk corresponds to any symbol index except k.

8. The method of claim 1, wherein the step of selecting the word which has the maximum value of said statistic measure comprises computing in a single pass, for all of the words of the set being considered, the current value of the statistic, storing a reference to the word having the highest value, and if a word with a higher value is encountered, changing the reference to refer to this word.

9. The method of claim 1, wherein the step of selecting a word comprises selecting the word from a predetermined subset of said main set of words.

10. The method of claim 1, comprising the preparatory step of retrieving from a computer readable storage medium an initial symbol error statistic which is derived from error probabilities of persons with specific learning challenges, in particular dyslexic persons.

11. The method of claim 1, further comprising the step of storing, on a computer readable storage medium, at the end of a training session,
   a) the user's personal symbol error matrix;
   b) for each symbol:
      1) the probability of occurrence over the language;
   c) the set of words, or a reference to a predetermined set of words;
   d) the ordering of the list of words; and
   e) for each word:
      1) its probability of occurrence over the said list of words;
      2) the updated word error probability, or its last r values, with in particular r=3;
      3) a counter q2 indicating how often the word has been entered correctly in the last q1 queries.

12. A computer program product loadable into an internal memory of a digital computer, comprising computer program code to make, when said program is loaded in the computer, the computer execute the method of claim 1.

13. A data processing device that is programmed to execute the method of claim 1.

* * * * *